Oct. 7, 1958
A. ROSENBERG
2,855,306
FAT-SOLUBLE VITAMIN COMPOSITION
Filed Oct. 1, 1954
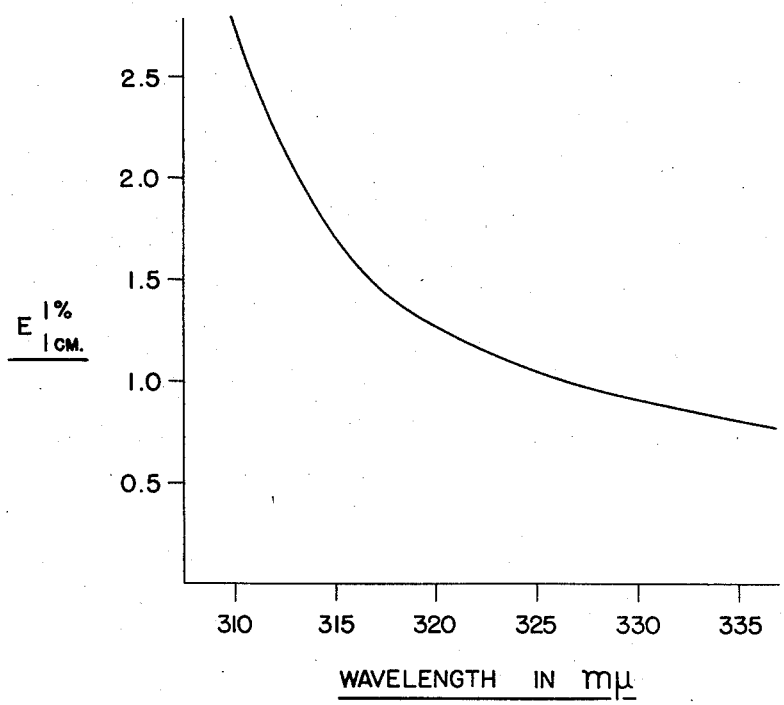
ULTRAVIOLET ABSORPTION CURVE OF AN ISO-
PROPANOL SOLUTION OF THE UNSAPONIFIABLE EXTRACT
OF THE WATER-INSOLUBLE PORTION OF THE CONDENSATE
OBTAINED IN THE DEODORIZATION OF VEGETABLE OILS BY
HIGH-VACUUM STEAM-DISTILLATION.
*INVENTOR.*
ADOLF ROSENBERG
BY
*A. J. Nydick*
ATTORNEY

United States Patent Office 2,855,306
Patented Oct. 7, 1958

2,855,306

FAT-SOLUBLE VITAMIN COMPOSITION

Adolf Rosenberg, Forest Hills, N. Y.

Application October 1, 1954, Serial No. 459,616

15 Claims. (Cl. 99—2)

This invention relates to a novel process for the stabilization of the fat-soluble vitamins in feed supplements and in feeds. More particularly it is directed to a novel dry composition containing the fat-soluble vitamins in a highly stabilized and physiologically available form.

The provision of means for fortifying feeds with supplements containing the fat-soluble vitamins in assured potencies is a problem which has commanded a vast amount of attention from scientists and technologists. Initially, it was thought sufficient to provide the fat-soluble vitamins for feed supplementation in such form that, until incorporation thereof in the feed, the vitamin content thereof was stabilized so as to withstand destruction or disintegration; and, further, that the feeds containing such supplements should exhibit a retention of the vitamin potency comparable to that of the supplements prior to their incorporation in the feed. However, an even greater and more perplexing problem exists with respect to providing a fat-soluble vitamin supplement that can be included as a component of mineral supplements that are now used to provide the necessary or essential trace-mineral supplementations of the basic feed rations.

The first successful solution of the problem of stabilizing fat-soluble vitamins, especially vitamin A, in a supplement that exhibited excellent retention of the vitamin potency was achieved by Melnick (U. S. Patent No. 2,496,634). His solution to the problem resided in providing dry, discrete particles of a high melting fat embodying the fat-soluble vitamins, which particles or granules are distributed in a powdery base, as of soy flour or soy meal, as a protective vehicle. The particles are made by incorporating the fat-soluble vitamins in a molten fatty base, and subsequently manipulating the mass of molten fat with the vitamins distributed uniformly therethrough into the ultimate granules.

However, the Melnick product cannot be incorporated as a component of a mineral concentrate used for the purposes above described. In the presence of the minerals, the Melnick product suffers severe rapid destruction of the vitamins, especially vitamin A. Thus, I have found that when one (1) part of the Melnick product (his example III) is incorporated in one (1) part of the following mineral concentrate:

| | Grams |
|---|---|
| Manganese sulfate, $MnSO_4H_2O$ | 74 |
| Potassium iodide, KI | 6 |
| Ferrous sulfate, $FeSO_4.4H_2O$ | 73 |
| Copper sulfate, $CuSO4.5H_2O$ | 11 |
| Zinc sulfate, $ZnSO4.7H_2O$ | 4 |
| Cobalt sulfate, $CoCO_4.H_2O$ | 0.6 |
| Calcium carbonate, q. s. 20 pounds. | | to provide a product containing 280 U. S. P units of vitamin A per gram, the retention of the vitamin A therein is very poor. The mixture shows a loss of from 95 percent to 100 percent of the vitamin A at the half-way stage of the storage period, i. e., 10 days at 45° C., the equivalent of 3 months at room temperature, according to the best judgment of workers in this field of research.

The destruction of the vitamin D also under those conditions, although not as complete as vitamin A, is, however, severe. Mineral mixtures fortified with the Melnick compositions to an initial potency of 100 U. S. P. units of viamin D per gram show a destruction of that vitamin of from 50 to 60 percent at the end of ten (10) days' storage at 45° C.

In my studies, vitamin A was determined according to the physico-chemical methods described in the U. S. Pharmacopea XIV with confirmatory biological assays conducted according to the method described in the U. S. Pharmacopea XIII. Vitamin D was determined by the chick bone-ash method described in A. O. A. C., 6th edition (1945).

It is to be noted that since mineral supplements are per se indestructible, they are, therefore, stored for much longer periods than other feed supplements prior to use. Suppliers of such supplements to feed manufacturers or to farmers cannot tolerate such excessive losses of the costly vitamins.

Hence, prior to my studies as set out in my pending applications, Ser. No. 365,788, filed July 2, 1953 and Ser. No. 412,399 filed February 24, 1954, there was nothing in the art which shows complete supplements that combined both minerals and vitamins with the possibility of guaranteeing vitamin potency thereof. The product described in my said pending application (Ser. No. 365,788) permits the manufacture and distribution of compositions containing minerals and vitamins with guaranteed vitamin potencies. The vitamin stability, particularly of the labile vitamin A in such mixtures is extraordinarily good, provided, that the mixture, as such, or the feed to which it will eventually be added, shall contain moisture not in excess of 9 percent. If the moisture exceeds 9 percent, vitamin destruction, particularly loss of vitamin A, occurs. Apparently the destructive influence of minerals on vitamin A in capsulated form is due according to my recent discovery to oxidative forces brought into operation by the presence of moisture.

Prior to my studies as set forth in my aforesaid pending application, Ser. No. 365,788, a compromise but very limited solution of the problem of vitamin stability, particularly of vitamin A in a mineral mixture, was hoped for by the expedient of diluting the mineral mixture with quality protein supplements (fish meal, milk protein, meat scrap, etc.). One popular such mixture calls for one part mineral component plus two parts protein, such mineral and protein mixture being supplemented with a stabilized vitamin preparation of Melnick. A rapid turnover (short storage period) of that mixed product is encouraged, but infrequently observed. But even here the vitamin A losses are still large, 60 percent to 83 percent of the vitamin A being destroyed within the first 10 days at 45° C. or 3 months at ordinary temperatures (initially 86 U. S. P. units per gram). Therefore, such protein-mineral-vitamin supplements must not only be manufactured with hube overages of the labile vitamins, but they also must be consumed within a period of less than 3 months after vitamin fortification—if they are to evidence nutritional value. The above also requires that moisture pick-up by the feed supplement be negligible during storage and shall be less than 9 percent. It is clear that such initial overcharging of a product with the labile vitamins in order to provide an adequate vitamin potency when it is fed to the animals is not only economically wasteful, but results in the pricing thereof at an inordinately high figure. Storage of the product in moisture-proof containers also introduces problems.

Since it is recognized that a deficiency in the ration of one essential nutrient, viz., the vitamin A, interferes with animal growth, reproduction and even survival, despite liberal quantities of the other nutrients, feed manufacturers furnishing the raisers of farm animals with a ration supplement have longed for a solution to their problem of assuring that the vitamin A, E, or D potency of their product will indeed be adequate at the time of feeding, without extra precautions to prevent moisture pick-up.

The failure of the vitamin A in Melnick's compositions to be as stable in feeds and in mineral supplements, as in the compositions themselves, is attributable in part to separation of the vitamin A in the fat granules from the protective influence of the antioxidants in the soy flour base.

The addition of one part of Melnick's composition, the vitamin containing granules in the powdery base, to 99 parts of a feed containing soybean meal in concentrations of 30 percent or less reduces to a large degree the protective influence on the vitamin A of the antioxidants in the Melnick soy flour base. The vitamin A product itself contains only soybean meal or flour around the fat particles embodying the vitamin A. In the feed, on the contrary, there are at least two parts of the other types of feed constituents per one part of the soybean meal which are in contact with the vitamin A component. Melnick has shown that other bases are inferior to soybean meal or soybean flour in protecting the vitamin A granules. This observation has been confirmed by publications from other laboratories (Wall, M. E., and Kelley, E. J., Ind. and Eng. Chem., vol. 43, p. 1146 (1951); Burns, M. J., and Quackenbush, F. W., Ind. and Eng. Chem., vol. 43, p. 1592 (1951)).

In the case of mineral supplements fortified with Melnick's compositions, there is still another and more serious factor that contributes to the oxidative loss of the fat-soluble vitamins. The mineral supplements contain, in plentiful quantity, the so-called trace minerals iron and copper, notorious for their influence in promoting the rapid oxidation of both fats and vitamin A. Even if iron and copper salts are not deliberately included as components of some mineral supplements, the other mineral salts furnish, as contaminants, substantial quantities of these essential elements. A good poultry ration will provide about 200 mg. of iron per kilo of ratio (200 parts per million), and about 15 mg. of copper per kilo. In the mineral supplement (concentrate) above described, the iron content is actually about 2000 parts per million and the copper content is about 300 parts per million.

I have found that such high concentrations of iron and copper exert a deleterious effect on the fat and on the vitamin A in Melnick's compositions. I have noted that as little as 3 parts per million of iron or 0.2 parts per million of copper markedly affects the resistance of even hydrogenated fats to oxidative deterioration and of the vitamins A, D, E and K contained therein. The observation that the loss of vitamin A parallels peroxide formation in the oil carriers of the vitamin A has been reported by several investigators (Halpern, G. R., Ind., and Eng. Chem., Anal. Ed., vol. 18, p. 621 (1946); Dassow, J. A., and Stansby, M. E., J. Amer. Oil Chem. Soc., vol. 26, p. 475 (1949); Kehren cited by Piskur, M. M., J. Amer. Oil Chem. Soc., vol. 27, p. 211 (1950)). Thus in supplementing mineral mixtures (and even feeds) with the Melnick composition, there results not only a dilution of his soybean meal base, but also the exposure of the fat particles, embodying the fat-soluble vitamins, to the catalytic pro-oxidant effects of iron and copper.

In the first of said pending application, the product is in the form of small beads wherein the labile vitamins are in a central core of solid fat around which core is a proteinaceous shell or film. Said shell is a barrier that separates the inner fat core containing the fat-soluble vitamins from deleterious agents (pro-oxidant catalysts) such as found in mineral mixes. The product just described above is in the form of dry discrete spheres or beads of small size, i. e., less than 2 mm. in diameter. The one disadvantage associated with this particular product was the tendency for this outer protection barrier to be hygroscopic. The deleterious effects of moisture pick-up on the stability of the fat-soluble vitamins, particularly vitamin A, was mentioned earlier.

In my second pending application, Ser. No. 412,399, the structure of the beads is reversed in that the central core comprises the fat-soluble vitamins suspended or entrapped within a fat-insoluble vehicle and this core is encased in a moisture-resistant substance in which the vehicular material comprising the core of the bead is insoluble. By this device a product was obtained wherein the fat-soluble vitamins, including vitamin A, exhibited excellent resistance to oxidative deterioration even when blended with mineral mixtures containing pro-oxidant metal salts and even in the presence of a high humidity. The only objection to this product was cost, since it first involved the formation of particles containing the vitamin A in the fat-insoluble material and then the encapsulation of those particles in the moisture-resistant outershell.

If it were possible to supplement the fat in compositions such as those described by Melnick with an anti-oxidant so powerful that it would impart stability to the fat-soluble vitamins of the same order of magnitude as obtained in the products of my aforesaid second pending application then the cost factor would make this new product most desirable as a supplement for feed or feed concentrates (including mineral mixes).

Up to the present time this has not been possible. In my own studies I have investigated all types of available anti-oxidants for this purpose, both singly and in combination and in no case could I obtain a product with the stability comparable to that obtainable with the products described in my pending application, Ser. No. 412,399. These anti-oxidants included hydroquinone, tocopherols, nordihydroguaiaretic acid, gum guaiac, propyl gallate, gallic acid, tannins, tannic acid, butylated hydroxyanisole, butylated hydroxytoluene, lecithin, ascorbic acid, phosphoric acid, citric acid, etc. In the course of my studies, I even investigated by-products of the food industries which might have anti-oxidant properties even though the nature of the anti-oxidant was never fully identified. One of the products so investigated was the water-insoluble portion of the condensate obtained in the deodorization of vegetable oil by high-vacuum steam-distillation, and designated for brevity merely by the term "condensate" or "Hot Well Oil," as this product is known in the trade. This material has been promoted because it contains a high content of tocopherols, but has not found a ready market because of the many other known and unknown contaminants therein present. A series of patents obtained by Hickman, as for example, Nos. 2,349,269/70/74/76/77/78 describes in detail how hot well oil is produced in the deodorization of fats. Hickman then describes processes for the recovery of the tocopherols present in the hot well oil and methods to purify this by-product of the vegetable oil industry to yield an anti-oxidant preparation suitable for the stabilization of fats and fat-soluble vitamins. Whereas Hickmon implies that the hot well oil can sometimes be employed effectively as an anti-oxidant in its original condition, he shows in every case, a purification of this material before using it as a potential anti-oxidant. Hickman specifically mentions the presence of iron salts in the hot well oil as being especially detrimental to its use as an anti-oxidant. A review of the examples cited by Hickman indicates that the minimal processing to which the hot well oil is subjected, is neutralization and filtration (alkali refining and filtration). This process converts the iron present in the hot well oil to insoluble ferric hydroxide and the free fatty acid to soap, both of which are eliminated from the oil during the removal of the aqueous phase and filtration steps.

In the course of my studies I have discovered that hot well oil as produced without any modifications or processing whatsoever, may be used to stabilize the fat-soluble vitamins, particularly vitamin A, in a fat material of definite characterization. It cannot be employed as such for stabilizing fats or vitamin A in all types of oil or fat-like materials.

Accordingly, it is among the objects of this invention to provide a stable form of vitamin A in a fat or fat-like material of small particulate size.

It is a further object to provide feeds containing the fat-soluble vitamins, including vitamin A, in a stable form, said vitamins being dispersed in a fat or fat-like material of small particulate size.

Another object is to provide mineral mixes containing admixed therein small particles of fat or fat-like substances containing in said fat or fat-like material the fat-soluble vitamins, including vitamin A, in highly stable form.

Still another object of this invention is to provide a process of preparing the stabilized fat or fat-like particles containing both the fat-soluble vitamins (including vitamin A) and hot well oil so that the most advantageous use may be made of the hot well oil to yield products of the highest order of stability with respect to the fat-soluble vitamins contained therein.

In Table 1 are presented analyses of hot well oils as obtained from the vegetable oil industry.

TABLE 1

*Analyses of the water-insoluble portion of the condensate obtained in the deodorization of vegetable oils by high-vacuum steam-distillation*

| Analysis | Condensates | | | |
|---|---|---|---|---|
| | I | II | III | IV |
| Total fatty acids, percent | 63 | 65 | 80 | 50 |
| Free fatty acids, percent | 34 | 31 | 29 | 37 |
| Unsaponifiable matter, percent | 33 | 39 | 16 | 42 |
| Total tocopherols, percent | 7.1 | 6.8 | 5.0 | 6.6 |
| Moisture, percent | 1.0 | 3.6 | 0.4 | 2.5 |
| Sediment, percent | 0.1 | 0.1 | 0.1 | 0.1 |
| Iron, parts per million (p. p. m.) | 290 | 250 | 205 | 220 |
| Saponification number | 113 | 104 | 102 | 115 |
| Iodine number (Wijs) | 94 | 83 | 86 | 86 |

Samples I and II are typical of such products, whereas samples III and IV represent the extremes obtained in testing different batches of hot well oil. All samples are characterized by a high percentage, 30–40 percent, of free fatty acids. This in itself would seem to make the product unfit for use in stabilizing vitamin A. Acids in oil are capable of converting vitamin A into the unsaturated hydrocarbon, anhydro vitamin A. This form of vitamin A is biologically inactive. However, it responds to the chemical colorimetric test (antimony trichloride), in a manner similar to the biologically active vitamin A. It is easily differentiated from true vitamin A by the marked differences in the ultra violet spectrophotometric absorption curve.

As mentioned earlier, hot well oil contains a high amount of tocopherols, usually 5–7 percent. The tocopherols are the natural anti-oxidants found in vegetable oils in concentrations up to 0.15 percent. The iron content of hot well oil is very high of the order of 200–300 p. p. m. When it is recognized that as little as three parts per million can markedly affect adversely the stability of an oil or fat, it can be readily appreciated why fat technologists have never considered, indeed have avoided using, hot well oil as such as an additive for stabilizing oils and fats against oxidative deterioration. The relatively high iodine number of hot well oil in the neighborhood of 90 indicates that the vehicular material for the tocopherols in hot well oil is in itself susceptible to oxidation. Furthermore, since hot well oil represents a distillate obtained in deodorizing vegetable oil and thereby represents a tremendous concentration of the objectionable odorous materials present in vegetable oil, it could never be used as such as a supplement to food products for human consumption. For this same reason feed manufacturers have been opposed to the inclusion of hot well oil as such in feeds for animal consumption despite the desire to use the hot well oil for this purpose as a dietary supplement furnishing tocopherols (vitamin E). Not only was there a feeling that the hot well oil additive might interfere with feed consumption, but that the flavor may carry through into the tissues of the animal. Despite vigorous attempts by the producers of hot well oil to interest the feed industry in this product, the opposition against the use thereof for the reasons hereinabove stated prevented its acceptance.

Before proceeding with my investigations of this material I had to satisfy myself that this fear on the part of the feed manufacturers was unfounded. Tests conducted on chickens subsisting on diets containing up to 1 percent hot well oil indicated that no adverse flavors were imparted to the tissues when the tissues of the test and the control birds (on the same diet but without the added hot well oil) were cooked and subjected to a flavor panel. This level of hot well oil in the ration is from 5 to 500 times the quantity I expected to use if the hot well oil proved satisfactory in stabilizing the vitamin A, in small fat or fat-like particles.

As mentioned above, investigators have reported that the loss of vitamin A parallels peroxide formation in the oil carriers of the vitamin A. Indeed, the changes in one have been employed to predict the changes in the other. If an antioxidant proved effective in stabilizing one, similar effects would be noted on the other. In my first experiments I evaluated hot well oil added as such to stabilize vegetable oil against oxidative deterioration. For these tests the active-oxygen method (AOM) described by King, A. E., Roschen, H. L., and Irwin, W. H., Oil and Soap, volume 10, page 105 (1933), involving aeration of the oils and fats at 98° C. was employed.

The results of this study are presented in Table 2.

TABLE 2

*Failure of the water-insoluble portion of the condensate obtained in the deodorization of vegetable oils by high-vacuum steam-distillation to protect vegetable oils against oxidative deterioration*

| Test System | | AOM Stability Value,[1] Hours |
|---|---|---|
| No. | Description | |
| 1 (a) | Cottonseed salad oil, iodine No. 110 | 12 |
| (b) | As 1(a)+5.0 percent condensate (6.8 percent tocopherols). | 10 |
| 2 (a) | Hydrogenated cottonseed oil; iodine no. 62; M. P. 44° C. | 52 |
| (b) | As 2(a)+5.0 percent condensate (6.8 percent tocopherols). | 45 |
| 3 (a) | Hydrogenated soybean oil; iodine No. 52; M. P. 50° C. | 385 |
| (b) | As in 3(a)+5.0 percent condensate (6.8 percent tocopherols). | 305 |

[1] Aeration of the oils at 98° C. under standardized conditions until a peroxide value of 100 milliequivalents per kilogram of oil was obtained.

It will be noted from the results shown in Table 2 that the added hot well oil failed to impart improved stability to these oils against oxidative deterioration. Even though this was disappointing, additional tests were carried out to study the influence of the hot well oil addition on stabilizing the most labile of the fat-soluble vitamins, vitamin A, in an oil solution. Fish liver oil, as such, is readily susceptible to oxidative deterioration. The vitamin A in fish liver oil, when incorporated in a dry mix, is very unstable. The reason for this is that the fish liver oil coats the feed particles as a thin layer thereby exposing greatly the vitamin A therein to surface oxidation. It is this extreme lability which has lead to the development of stabilized dry vitamin A products such as those described by Melnick and in my pending application. In testing the fish liver oil samples, these were pipetted as a thin layer, 2 mm. in depth, on the bottom of a beaker and the latter stored in an oven at 45° C. The fish liver oil in the uncovered beakers was subjected to the deteriorating effect of the circulating air in the oven. The storage of the fish liver oil as a thin layer, simulates the fish liver oil as it would be present in feed. The accelerated holding tests yield results in about one-ninth the time required for the same results to be obtained when the test system is stored in room temperature (25° C.). Thus, seven days storage at 45° C. is equivalent to about two months storage at 25° C.

Analyses for vitamin A were conducted on the unsaponifiable extracts by both the spectrophotometric and the colorimetric (antimony trichloride) tests. There are many materials which absorb light at 325 millimicrons (m$\mu$). In some spectrophotometric tests the reading at 325 m$\mu$ is multiplied by a factor to obtain an estimate of vitamin A unitage. In Fig. 1 is shown the ultra violet absorption curve of an isopropanol solution of the unsaponifiable extract of hot well oil. It is apparent that this material absorbs light to some degree at 325 m$\mu$, the region in which vitamin A alcohol exhibits maximal light absorption. However, the shape of the ultra violet absorption curve of the hot well oil extract is atypical of that of pure vitamin A alcohol. There are few compounds which have an ultra violet absorption curve exactly the same shape of pure vitamin A. In the U. S. P. XIV spectrophotometric method, corrections are made for the deviation of the absorption curve of the test sample from that of pure vitamin A. In the present investigation such corrections were made. There are compounds viz., anhydro vitamin A, which react with the antimony trichloride to yield a blue color similar to that of vitamin A. Only when the spectrophotometric values, with full correction made for deviations in the ultra violet absorption curve, agree with those obtained by the colorimetric test, is one assured that true biologically active vitamin A is being measured. This has been confirmed repeatedly in my investigations by biological assays conducted on various test systems using the U. S. P. XIII biological assay method.

The results of this study on vitamin A stability are summarized in Table 3.

proved slightly the stability of the vitamin A but to a degree of no practical significance. Compare results on test system No. 3 with those of test system No. 2.

Despite the disappointing results obtained thus far, it was decided to critically evaluate the effectiveness of the hot well oil as a supplement in stabilizing the fat-soluble vitamins, particularly vitamin A, in products containing high melting fats as the vehicular material. For purposes of definition, the term "high melting fat" designates a material which is soluble in oil solvents and has a melting point of above 45° C. and less than 95° C., i. e., in the range of 45°–95° C. In this category are: hydrogenated vegetable oils, hydrogenated animal fat, paraffin waxes, microcrystalline paraffin waxes, mono- and/or diglycerides of high melting fatty acids, high melting fatty acids and inorganic salts of high melting fatty acids.

Contrary to my expectations, based on the ineffectiveness of the hot well oil to stabilize fat or vitamin A against oxidative deterioration, as shown earlier in the specification (see Tables 2 and 3), the hot well oil, without any refinement or purification whatsoever proved to be highly effective in stabilizing the vitamin A when contained in the high melting fatty vehicular materials. This conclusion is readily apparent from the data summarized in Table 4. For a critical evaluation of the protective efficacy of the hot well oil supplement it was necessary to include six control samples, as shown in Table 4. Nine examples illustrating the value of my discovery and the scope thereof are also included in Table 4.

In this study, vitamin A was determined by both spectrophotometric and colorimetric assay for reasons given earlier in the specification. Since most of these samples, controls included, would exhibit good stability under the usual accelerated holding condition, it was decided to evaluate them under more severe test conditions. This involved storage of the spray-chilled fat particles containing additives (as listed in Table 4) in a one plus nine (1+9) admixture with the mineral mix described earlier in the specification; and storing this mixture as a thin layer at 45° C. exposed to the freely circulating air within the incubator. Seven days storage under such test conditions is equivalent to nine weeks storage at room temperature. In each case the test system was set up in multiple units, each comprising ten grams of

TABLE 3

*Failure of the water-insoluble portion of the condensate obtained in the deodorization of vegetable oils by high-vacuum steam-distillation to protect vitamin A in a liquid oil vehicle against oxidative deterioration*

| Test System | | Vitamin A Test | Vitamin A in Test System at 45° C. after— | | | |
|---|---|---|---|---|---|---|
| No. | Description | | 0 Days | 2 Days | 4 Days | 7 Days |
| | | | U. S. P. units per gm. | | | |
| 1 | Fish liver oil, freshly processed. | Spectro [1]<br>Colorim [2] | 9,220<br>9,180 | 7,610<br>7,800 | 3,010<br>3,220 | 640<br>800 |
| 2 | As No. 1+5.0 percent condensate (6.8 percent tocopherols). | Spectro<br>Colorim | 8,750<br>8,890 | 7,040<br>7,290 | 3,110<br>3,320 | 720<br>810 |
| 3 | As No. 1+1.0 percent pure tocopherol concentrate (34 percent). | Spectro<br>Colorim | 9,110<br>9,240 | 7,930<br>8,000 | 4,650<br>5,000 | 1,010<br>1,140 |

[1] Spectrophotometric.
[2] Colorimetric.

It will be noted that vitamins in the fish liver oil were very unstable during this holding test. The addition of the hot well oil in 5 percent concentration did not improve the stability of the vitamin A in the fish liver oil. The addition of a pure tocopherol concentrate (34 percent mixed tocopherols in a vegetable oil solution) in a concentration to furnish the same tocopherol content as was obtained when the hot well oil was added, imtotal material. At the end of a given holding period the entire ten grams were taken for vitamin A analysis. As a further check on the reliability of the assay methods, test systems, exactly the same as those described in Table 4, were also set up in the same number but without any vitamin A added. These were used as the assay blanks to correct for any possible interference of the other ingredients in the test systems on the reliability

TABLE 4

*Effectiveness of the water-insoluble portion of the condensate obtained in the deodorization of vegetable oils by high-vacuum steam-distillation, in protecting vitamin A in a solid fat vehicle against oxidative deterioration*

| Example | Test Composition | Vitamin A Test | Vitamin A in Test System at 45° C. after— | | | |
|---|---|---|---|---|---|---|
| | | | 0 Days | 14 Days | 28 Days | 42 Days |
| | | | U. S. P. units per gm. | | | |
| Control A | Hydrogenated soybean oil (M. P. 68° C.)+antioxidant mixture+emulsifier+fish liver oil (200,000 USP units of vitamin A/gm. | Spectro [1] | 3,840 | 3,070 | 1,870 | 110 |
| | | Colorim [2] | 3,910 | 3,140 | 1,920 | 320 |
| Control B | As Control A+0.2 percent pure tocopherol concentrate (34 percent tocopherols). | Spectro | 3,610 | 3,340 | 2,620 | 1,650 |
| | | Colorim | 3,810 | 3,520 | 2,700 | 1,700 |
| Control C | As Control A+1.0 percent pure tocopherol concentrate (34 percent tocopherols). | Spectro | 3,710 | 3,510 | 2,810 | 1,710 |
| | | Colorim | 3,810 | 3,690 | 2,860 | 1,860 |
| Control D | As Control A+2.0 percent pure tocopherol concentrate (34 percent tocopherols). | Spectro | 3,600 | 3,410 | 2,610 | 1,650 |
| | | Colorim | 3,720 | 3,650 | 2,810 | 1,710 |
| Control E | As Control A, but without antioxidant mixture, +2.0 percent pure tocopherol concentrate (34 percent tocopherols). | Spectro | 3,680 | 3,390 | 2,050 | 860 |
| | | Colorim | 3,810 | 3,490 | 2,110 | 900 |
| Control F | As Control A, but without antioxidant mixture, +2.0 percent pure tocopherol concentrate (34 percent tocopherols)+iron stearate to yield 25 p. p. m. of iron. | Spectro | 3,510 | 2,630 | 210 | 0 |
| | | Colorim | 3,610 | 2,710 | 304 | 0 |
| 1 | As Control B but 1.0 percent condensate (6.8 percent tocopherols) replacing the pure tocopherol concentrate. | Spectro | 3,860 | 3,610 | 3,190 | 2,450 |
| | | Colorim | 3,850 | 3,720 | 3,210 | 2,610 |
| 2 | As Control C but 5.0 percent condensate (6.8 percent tocopherols) replacing the pure tocopherol concentrate. | Spectro | 3,740 | 3,600 | 3,010 | 1,860 |
| | | Colorim | 3,910 | 3,710 | 3,200 | 1,910 |
| 3 | As Control D but 10.0 percent condensate (6.8 percent tocopherols) replacing the pure tocopherol concentrate. | Spectro | 3,870 | 3,520 | 2,710 | 1,410 |
| | | Colorim | 3,750 | 3,710 | 2,810 | 1,520 |
| 4 | As Control E but 10.0 percent condensate (6.8 percent tocopherols) replacing the pure tocopherol concentrate. Composition contains same amount of iron (25 p. p. m.) as Control F. | Spectro | 3,610 | 3,350 | 2,890 | 1,140 |
| | | Colorim | 3,780 | 3,410 | 2,910 | 1,210 |
| 5 | Hydrogenated tallow (M. P. 58° C.)+emulsifier+distilled vitamin A esters in oil (400,000 U. S. P. units of vitamin A/gm.)+1.0 percent condensate (5.0 percent tocopherols). | Spectro | 3,750 | 3,620 | 2,800 | 2,020 |
| | | Colorim | 3,860 | 3,740 | 2,920 | 2,110 |
| 6 | Microcrystalline wax (M. P. 85° C.)+emulsifier+synthetic vitamin A palmitate in oil (1,000,000 U. S. P. units of vitamin A/gm.)+2.5 percent condensate (7.1 percent tocopherols). | Spectro | 3,610 | 3,630 | 3,110 | 2,110 |
| | | Colorim | 3,780 | 3,650 | 3,200 | 2,200 |
| 7 | Glyceryl monostearate M. P. 68° C.)+5.0 percent condensate (6.6 percent tocopherols)+synthetic vitamin A acetate in oil (400,000 U. S. P. units of vitamin A/gm.). | Spectro | 3,840 | 3,720 | 3,040 | 2,210 |
| | | Colorim | 3,900 | 3,830 | 3,160 | 2,320 |
| 8 | 50:50 mixture of stearic acid (M. P. 69° C.) and sodium stearate+fish liver oil (200,000 U. S. P. units of vitamin A/gm.)+5.0 percent condensate (6.6 percent tocopherols). | Spectro | 3,710 | 3,600 | 2,960 | 2,040 |
| | | Colorim | 3,840 | 3,710 | 3,010 | 2,160 |
| 9 | Partially hydrogenated soybean oil (M. P. 50° C.)+antioxidant mixture+emulsifier+fish liver oil (200,000 U. S. P. units of vitamin A/gm.)+1.0 percent condensate (6.8 percent tocopherols). | Spectro | 3,700 | 2,820 | 1,630 | 0 |
| | | Colorim | 3,810 | 2,920 | 1,780 | 0 |

[1] Spectro.=spectrophotometric.
[2] Colorim.=colorimetric.

of the vitamin A assays. As was mentioned earlier in the specification (see Fig. 1), the unsaponifiable extract of hot well oil exhibits some absorption of light in the region where vitamin A absorbs maximally. This irrelevant absorption is of a small order of magnitude considering the small amount of hot well oil added in relationship to vitamin A and is corrected for by the use of the blank test systems mentioned above and by the method of calculation in the U. S. Pharmacopea XIV which eliminates irrelevant absorption in estimating vitamin A potency. The unsaponifiable extract of the hot well oil does not react at all with the antimony trichloride reagent to give a blue color and hence does not interfere with the colorimetric test.

The entire ten gram sample in each case was saponified under reflux with 150 ml. of alcohol and 15 ml. of potassium hydroxide solution (50 percent aqueous). After cooling, two 40 ml. aliquots were taken for extraction of the unsaponifiable fractions as described in the U. S. Pharmacopea XIV, one aliquot for the spectrophotometric test and the other for the colorimetric determination.

In preparing the examples and the controls listed in Table 4, the following methods were used. When an antioxidant mixture is mentioned as an additive, this consisted of 0.6 percent butylated hydroxyanisole, 0.3 percent of propyl gallate and 0.025 percent citric acid. The emulsifier, when added, consisted of 3 percent commercial lecithin derived from soy bean oil. The pure tocopherol preparations used in the control samples (B–F) represented molecularly distilled tocopherols derived from vegetable oils (product of Distillation Products Industries). The concentration of the pure mixed tocopherols is 34 percent in a liquid vegetable oil solvent. All other components of the examples and controls shown in Table 4 are identified in that table under "test compositions."

In preparing the examples and controls listed in Table 4 the fatty vehicular material was heated to a temperature of about 10° C. above its melting point, lecithin and anti-oxidant were added, where indicated, and the vitamin A was added last. Whenever the hot well oil additions were made, in the examples listed, this was done either along with the anti-oxidant mixture or added in its place as shown in Table 4. The heated solution of vehicular fat with all additives was spray-chilled to yield small beads, predominantly 20–60 mesh in size. These beads were then employed in the stability tests described in Table 4.

From the results shown in Table 4 the following conclusions are justified:

(1) The agreement between spectrophotometric and colorimetric assay values is an excellent indication that true biologically active vitamin A was being measured.

(2) Vitamin A is remarkably stabilized when the test system contains as little as 1 percent added hot well oil. (Compare Example 1 with Control A.)

(3) The stabilizing influence of hot well oil on vitamin A is not due solely to its tocopherol content. (Compare Example 1 with Control B.)

(4) As the hot well oil supplement is increased in concentration there is marked stabilization of the vitamin A but not to the same degree as obtained in a 1 percent addition of hot well oil. (Compare Examples 2 and 3 with Example 1.) The decrease in stabilizing value with increasing concentration of hot well oil in the test system is not related to increasing tocopherol content. (Compare Examples 1, 2 and 3 with Controls B, C and D.) Apparently there is a factor in hot well oil which, if added in sufficiently high concentration, can negate in part the stabilizing influence on vitamin A of unknown components in hot well oil. The concentration of hot well oil as a supplement for stabilizing vitamin A in the high melting fats is desirably between 0.2 percent and 15 percent and preferably between 0.5 percent and 2.5 percent.

(5) Hot well oil may be added as the sole stabilizer in protecting vitamin A in the high melting fat. (Compare Example 4 with Control A.) This effect cannot be explained solely on its tocopherol content. (Compare Example 4 with Control E.)

(6) The truly remarkable stabilizing influence of the beneficial components of hot well oil is demonstrable when the effect of the known deleterious component in hot well oil i. e., the iron content, is evaluated. Adding iron in the form of iron stearate to the pertinent control system (F) in the same concentration as found in one of the products of this invention (Example 4), has a marked deleterious effect on the stability of vitamin A when protected solely by added tocopherols.

(7) The remarkable stabilizing effect of hot well oil in protecting vitamin A contained in a solid bead or particle manifests itself when the vehicular fat is any one of a variety of fats as shown in Examples 5–9 and even when the melting points of such vehicular fats range over the span shown. In the absence of the hot well oil supplements, as employed in Examples 5–9, the vitamin A is very unstable, practically all of it being lost by the end of the first fourteen days of the holding test.

(8) Hot well oil has a marked stabilizing influence in protecting vitamin A even in the absence of the emulsifier, lecithin, regarded by many workers in the field as having antioxidant properties. (Compare Examples 7 and 8 with Control A.) There is no need for added lecithin in making Examples 7 and 8 since glycerol monostearate in Example 7 and sodium stearate in Example 8 are emulsifying agents in themselves.

(9) The stabilizing influence of hot well oil in protecting vitamin A is independent of the source of the vitamin A. The latter may be fish liver oil (Example 1), distilled vitamin A ester in oil (Example 5), synthetic vitamin A palmitate in oil (Example 6) and synthetic vitamin A acetate in oil (Example 7), and even carotene (provitamin A).

The vitamin A values obtained by the physico-chemico methods of assay, listed in Table 4, where spot-checked by biological assay with good agreement regularly obtained in all cases.

Tests comparable to those described in Table 4 were conducted with vitamin D added in place of the vitamin A and in addition to the vitamin A. The same stabilizing influence of the hot well oil in protecting the vitamin D was noted.

Results similar to those shown for the examples in Table 4 were obtained when other methods were employed for preparing the small fat particles containing the vitamin A. These other methods involved chilling a block of the solidified compositions, the same as those listed in Table 4, grinding this block and passing the ground material through a series of sieves to obtain particles predominantly of 20–60 mesh in size. Another method which was found to be satisfactory was chilling the hot solution on a chill-roll, flaking and then grinding the flakes to the particles size indicated above.

It will be understood that the foregoing description of the invention and the examples thereof are merely illustrative of the principles of the invention. Accordingly, the appended claims are to be construed as defining the invention within the full spirit and scope thereof.

I claim:

1. A composition comprising a high melting fat, at least one fat-soluble vitamin, and about from 0.2 to 15% of crude hot well oil.

2. A composition in accordance with claim 1 in granular form.

3. A composition in accordance with claim 1 wherein the fat has a melting point ranging from 45° C. to 95° C.

4. A composition in accordance with claim 1 wherein the crude hot well oil is present in an amount of from 0.5 percent to 2.5 percent.

5. A composition comprising a fat having a melting point ranging from 45° C. to 95° C., at least one fat-soluble vitamin, and crude hot well oil being present in an amount of from 0.2 percent to 15 percent.

6. A composition comprising a fat having a melting point ranging from 45° C. to 95° C., at least one fat-soluble vitamin, and crude hot well oil, the hot well oil being present in an amount of from 0.5 percent to 2.5 percent.

7. A composition comprising a fat having a melting point of from 45° C. to 95° C., fat-soluble vitamins and crude hot well oil, the hot well oil being present in an amount of 0.2 percent to 15 percent.

8. A composition comprising a fat having a melting point of from 45° C. to 95° C., fat-soluble vitamins and crude hot well oil, the hot well oil being present in an amount of from 0.5 percent to 2.5 percent.

9. A composition comprising a high melting fat, vitamin A, and about from 0.2 to 15% of crude hot well oil.

10. A composition comprising a high melting fat, vitamin D, and about from 0.2 to 15% of crude hot well oil.

11. A composition comprising a high melting fat, vitamin E, and about from 0.2 to 15% of crude hot well oil.

12. A composition comprising a high melting fat, vitamin E, and about from 0.2 to 15% of crude hot well oil, the vitamin E being supplied by said hot well oil.

13. A feed supplement containing fat-soluble vitamin characterized by stability of said vitamin comprising a mineral mixture including a composition in accordance with claim 2.

14. A supplemented feed containing fat-soluble vitamin characterized by stability of said vitamin comprising basic components providing protein and carbohydrate plus a composition in accordance with claim 2.

15. A supplemented feed containing fat-soluble vitamin characterized by stability of said vitamin comprising basic components providing protein and carbohydrate plus a composition in accordance with claim 12.

References Cited in the file of this patent
UNITED STATES PATENTS

| | | |
|---|---|---|
| 2,349,278 | Hickman | Mar. 23, 1944 |
| 2,363,672 | Jakobsen | Nov. 28, 1944 |
| 2,496,634 | Melnick | Feb. 7, 1950 |
| 2,702,262 | Bavley et al. | Feb. 15, 1955 |